US006811391B1

(12) United States Patent
Klaus et al.

(10) Patent No.: US 6,811,391 B1
(45) Date of Patent: Nov. 2, 2004

(54) ELECTRICALLY DRIVEN APPARATUS FOR EJECTING INJECTION MOLDED PARTS

(75) Inventors: M. Barr Klaus, Cincinnati, OH (US); David S. Bernardi, Loveland, OH (US); Todd W. Brown, Batavia, OH (US)

(73) Assignee: Milacron Inc., Cincinnati, OH (US)

( * ) Notice: Subject to any disclaimer, the term of this patent is extended or adjusted under 35 U.S.C. 154(b) by 0 days.

(21) Appl. No.: 09/980,508

(22) PCT Filed: May 2, 2000

(86) PCT No.: PCT/US00/12113

§ 371 (c)(1),
(2), (4) Date: Nov. 2, 2001

(87) PCT Pub. No.: WO00/66341

PCT Pub. Date: Nov. 9, 2000

Related U.S. Application Data (63) Continuation-in-part of application No. 09/303,938, filed on May 3, 1999, now abandoned.

(51) Int. Cl.[7] .............................................. B29C 45/40
(52) U.S. Cl. ...................................... 425/556; 425/444
(58) Field of Search ................................ 425/351, 422, 425/444, 556, DIG. 5

(56) References Cited

U.S. PATENT DOCUMENTS

| | | | | |
|---|---|---|---|---|
| 3,680,998 A | * | 8/1972 | Sharman ..................... | 425/394 |
| 3,726,625 A | * | 4/1973 | Rees ........................... | 425/247 |
| 4,552,525 A | * | 11/1985 | Stehr .......................... | 425/422 |
| 4,735,080 A | * | 4/1988 | Stehr .......................... | 72/427 |
| 5,067,892 A | * | 11/1991 | Rahn et al. ................. | 425/556 |
| 5,736,079 A | * | 4/1998 | Kamiguchi et al. ........ | 264/40.1 |

\* cited by examiner

Primary Examiner—W. L. Walker
Assistant Examiner—Emmanuel Luk
(74) Attorney, Agent, or Firm—John W. Gregg; Stephen H. Friskney (57) ABSTRACT

A molded part ejection tystem (103) includes a drive mechanism having a reversible servomotor (240). The drive mechanism for the ejection system includes a cam-and-follower arrangement whereby a circular cam member (252) is driven by the servomotor (240) through a drive shaft (250) that is connected with the cam member (252) and is offset from the center of the circular cam track (254). A cam follower (260) connected with an ejector drive rod (238), and the cam follower (260) rides in the cam track (254) to cause linear movement of the ejector drive rod (238) as the cam follower (260) follows the circular cam through its non-circular path of motion. Rotation of the servomotor (240) in one direction of rotation operates the part ejection system, while rotation of the servomotor in the opposite direction of rotation provides power to another portion of the machine during another portion of a molding machine operating cycle, such as a core-pull system. The servomotor drive shaft (241) includes a pair of one-way clutches that are each operable in a different direction of rotation of the motor drive shaft (241). In one direction of rotation, the motor (240) actuates a part ejection mechanism and in the other direction of rotation, the motor (240) can provide power to operate a different system of the molding machine. The present invention thus permits a single motor to perform two functions at different times during the operating cycle of an injection molding machine.

11 Claims, 6 Drawing Sheets

ELECTRICALLY DRIVEN APPARATUS FOR EJECTING INJECTION MOLDED PARTS

This is a 371 of PCT/US00/12113, filed May 2, 2000, which is a Continuation Part of U.S. application Ser. No. 09/303,938, filed May 3, 1999, now abandoned.

TECHNICAL FIELD

The present invention relates to injection molding machines for molding plastics articles and, more particularly, to a mold clamp system for an injection molding machine, wherein the clamp system includes an electrically-operated ejector mechanism for separating the molded part from a molding surface and for ejecting the part from the mold.

BACKGROUND ART

Injection molding machines are utilized for molding plastic parts that range from simple to quite complex configurations. In the course of injection molding a part, two cooperating mold halves that define a mold cavity corresponding to the part to be molded are brought together in contacting relationship. The molds halves are held together under pressure so that when molten plastic material is injected into the mold cavity, a molded part conforming to the shape of the mold cavity Is produced. Often the molded part will adhere to a surface of the mold cavity, and it must be physically separated from the surface so that the mold can be employed during subsequent molding cycles to form additional parts.

Typically, one or more ejector pins assist removal of molded parts from an injection mold cavity. The ejector pins are slidably carried in one of the mold halves, usually the movable mold half, and they are movable into and out of the mold cavity so that they can be brought into contact with a molded part and thereby push the molded part away from the molding surface. In the past, when most injection molding machines were hydraulically-operated, the ejector pins were actuated by an hydraulic linear actuator that caused the pins to extend into the mold cavity during a ejection operation, and to retract from the mold cavity after a part had been separated from the molding surface and ejected from the mold half.

With the advent of completely electrically-powered injection molding machines, electric motors and mechanical drive systems replace hydraulically-operated systems, including hydraulic pumps, hydraulic cylinders, and the like. Such motors and drive systems provide or for the necessary rotary and linear movements of the operative parts of the injection molding machine. Thus, in an all-electric machine a different mechanism must be employed to actuate the ejector pins. In that regard, one way to actuate the ejector pins electrically is to provide a screw and nut arrangement to convert the rotary output of an electric motor to linear movement, thereby causing Me ejector pins to extend into and to retract from the mold cavity. Providing the power for the ejection function in that manner, however, requires that a separate electric motor be provided to operate the screw mechanism that moves the ejector pins. Such a drive arrangement requires that the motor (a) accelerate to rotate in a first direction, causing the ejector pins to extend into the mold cavity, (b) decelerate and stop after part ejection has occurred, (c) accelerate to rotate in a reverse direction to cause the ejector pins to retract into the mold member after part ejection has been accomplished, then (d) decelerate and stop so that the pins are properly retracted. Given the need to accelerate, decelerate, stop and reverse the direction of rotation of the ejection drive motor for this type of eject system, its operation includes "dead" (unproductive) time that unnecessarily extends the time during which the ejection drive motor must be active. It is therefore desirable to minimize such dead time.

Additionally, because the ejection phase of an injection molding cycle is such a brief period of time relative to the machine cycle, it is also desirable to provide an ejector pin actuation mechanism that does not require a separate, dedicated electric motor, thereby simplifying the overall injection molding machine drive system and lowering its cost.

It is therefore an object of the present invention to provide an ejector pin actuation mechanism that does not require stopping and reversal of an ejection system drive motor during part ejection.

It is another object of the present invention to provide an ejector pin actuation mechanism that operates a molded part ejection system by means of an electric motor that can also be employed to perform additional functions during a molding cycle at those times when the part ejection system is not in operation.

DISCLOSURE OF INVENTION

Briefly stated, in accordance with one aspect of the present invention, part ejection apparatus is provided for separating a molded part from a molding surface and for ejecting the molded part from a mold cavity defined by a pair of mold members. The apparatus includes an ejector pin actuator configured to engage at least one ejector pin that is slidably carried in a mold member for movement into and out of the mold cavity. In particular, the ejector pin is operable for separating a molded part from the molding surface and for ejecting the molded part from a cavity by moving axially from a retracted position within the mold member, to an extended position in which part of the ejector pin extends outwardly beyond the molding surface and into the mold cavity.

The apparatus further includes an electrically-powered ejector pin drive system for moving the ejector pin actuator along a guide surface. The ejector pin drive system includes an electric motor having a rotatable output shaft, and a cam-and-follower connected with the motor output shaft and with the ejector pin actuator for converting motor drive shaft rotary motion to linear movement for moving the ejector pin actuator linearly relative to the mold member, into and out of the mold cavity, while the motor is rotated in only one direction of rotation to operate the ejector pin actuator. The cam member is configured to allow the position of its geometric center to be varied with respect to the motor output shaft, thereby enabling adjustment of the length of the ejector stroke. In addition, if desired, the motion imparted to the follower by the cam member can be customized to pulsate the ejector pins during a single revolution of the cam member.

BEST MODE FOR CARRYING OUT THE INVENTION

Figure 1:
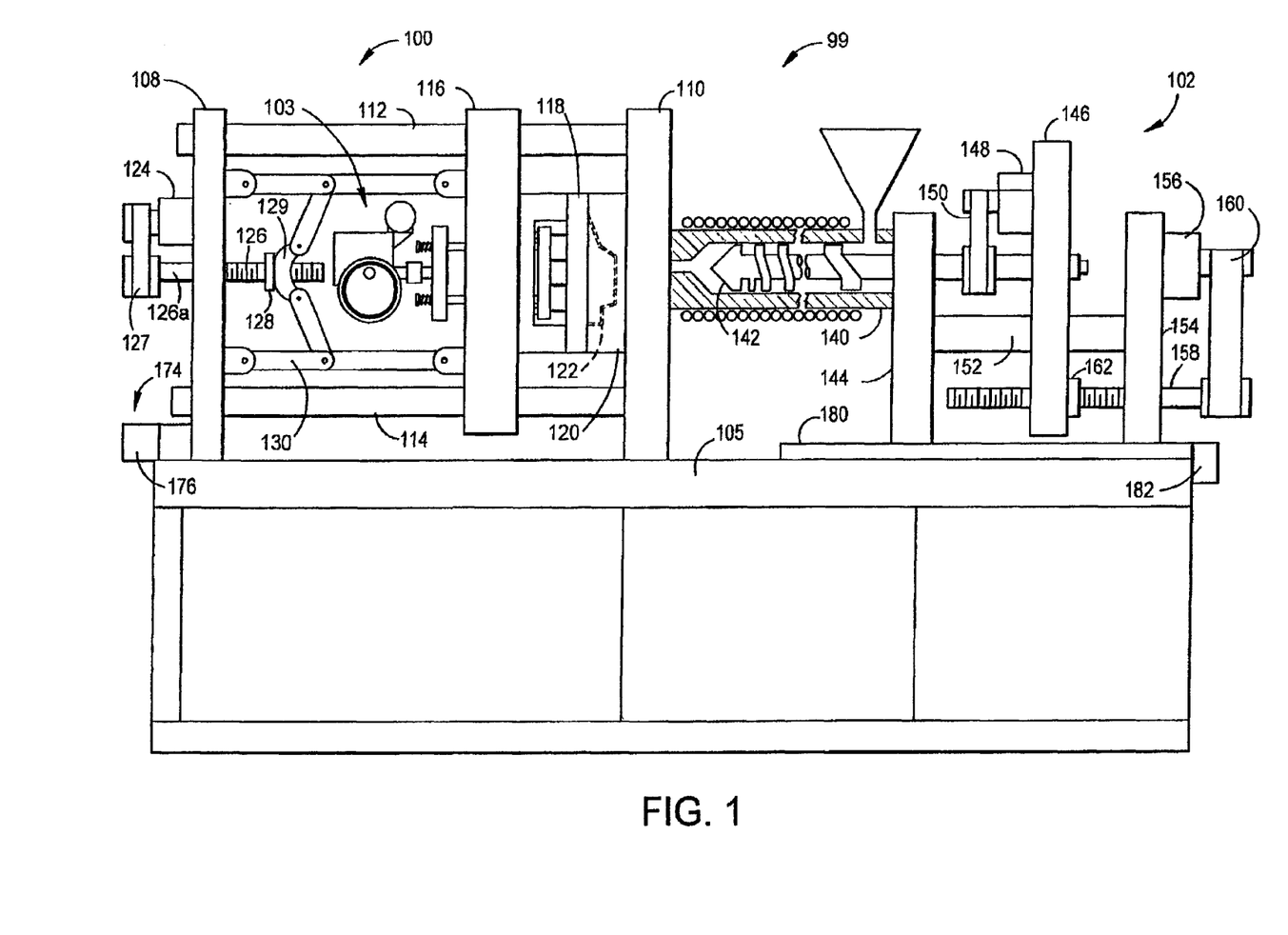
FIG. 1 is a diagrammatic side elevational view, partially broken away and partially in section, showing an all-electric injection molding machine having a part ejection system in accordance with the present invention.

Referring now to the drawings, and particularly to FIG. 1 thereof, there is shown an injection molding machine 99 in accordance with the present invention. The machine shown is an all-electric injection molding machine, in which each of the motions of the various portions of the machine, whether the motions are rotary or linear, is driven by one or more electric motors and not by hydraulic motors or actuators. Machine 99 includes a mold clamp unit 100 for supporting and for opening and closing a pair of cooperating mold members 118, 120 that together form a mold cavity 122 that defines the part to be molded. A plastication and injection unit 102 is provided for plasticating molding material and for injecting molten molding material into the mold cavity. A part ejection unit 103 is provided within clamp unit 100 for ejecting a molded part from a mold after the molding material has cooled sufficiently and the molds have been opened to permit removal of the molded part. Each of mold clamp unit 100 and injection unit 102 is mounted on a base 105.

Mold clamp unit 100 includes a pair of generally rectangular, stationary platens 108 and 110 that are spaced from each other and have opposed surfaces that are substantially parallel with each other. Four parallel tie bars, only two of which 112, 114 are visible in FIG. 1, are in a rectangular array and are securely carried at the corners of each of platens 108, 110. The tie bars serve as respective guide members for slidably supporting a generally rectangular movable platen 116 for sliding movement toward and away from stationary platen 110. Movable platen 116 carries one mold half 118, and stationary platen 110 carries the second mold half 120 that cooperates with mold half 118 to define the mold cavity 122 when the mold halves are brought together in contacting relationship, as when mold clamp unit 100 is in the closed condition as shown in FIG. 1. A gate opening (not shown) is provided in mold half 120 to permit communication between mold cavity 122 and injection unit 102 and to enable the injection of molten plastic material into mold cavity 122.

The power for traversing the movable platen 116 back and forth relative to stationary platen 110 can be provided by an electric motor 124 that is carried on stationary platen 108. Motor 124 is operatively connected to a screw 126 by a belt coupling 127. Screw 126 includes a shaft portion 126a that is rotatably supported in a bearing (not shown) carried by stationary platen 108. Although a belt drive arrangement is shown in FIG. 1 to transfer rotary power from motor 124 to screw 126, a gear drive or other form of mechanical coupling can be employed instead, if desired. Nut 128 that engages with screw 126 is non-rotatably mounted on a central link member 129 that is connected with arms of a toggle and link mechanism 130 that together with screw 126 transfers rotary output power from motor 124 to linear movement of movable platen 116 during the operation of mold clamp unit 100.

Injection unit 102 includes a plastication chamber 134 formed by a tubular barrel 140 that rotatably carries a plastication screw 142 for plasticating and injecting molding material. In addition to rotational movement within barrel 140 plastication screw 142 is also axially linearly movable within barrel 140. Plastication screw 142 is partially supported in a first stationary support member 144 that also supports barrel 140. The outermost end of plastication screw 142 that extends outwardly of barrel 140 is rotatably carried in a movable support member 146.

Rotational motion of plastication screw 142 is imparted by an electric motor 148 that is mechanically drivingly coupled with screw 142 by a belt coupling 150. Again, although shown as a belt drive, a gear drive or other form of mechanical coupling can be employed instead, if desired. Movable support member 146 is slidably supported and carried on a pair of parallel guide bars 152, only one of which is visible in FIG. 1. Guide bars 152 extend between and are securely connected with each of first stationary support member 144 and second stationary support member 154. An electric motor 156 is mounted on second stationary support member 154 and is drivingly connected with a screw 158 that is rotatably carried by second stationary support member 154. The drive arrangement shown is a belt 160, although a gear drive or other form of mechanical coupling can be employed instead, if desired. A screw nut 162 is mounted on movable support member 146. Motor 156 is operative to impart linear motion to movable support member 146, and consequently also to plastication screw 142. The linear movement of movable support member 146 is in a direction toward and away from first stationary support member 144.

Movement of plastication chamber 134 toward and away from stationary platen 110 can be effected by mounting injection unit 102 on an injection sled 180 that is movable along base 105 on suitable tracks (not shown). Movement of injection sled 180 can be accomplished by an electric motor 182 that is operatively coupled with sled 180 through a suitable mechanical drive arrangement. Similarly, stationary platen 108 can be shifted relative to stationary platen 110, to accommodate molds of differing sizes, by providing an electric drive motor 176 that is coupled with stationary platen 108 through a suitable drive system 174.

Figure 2:
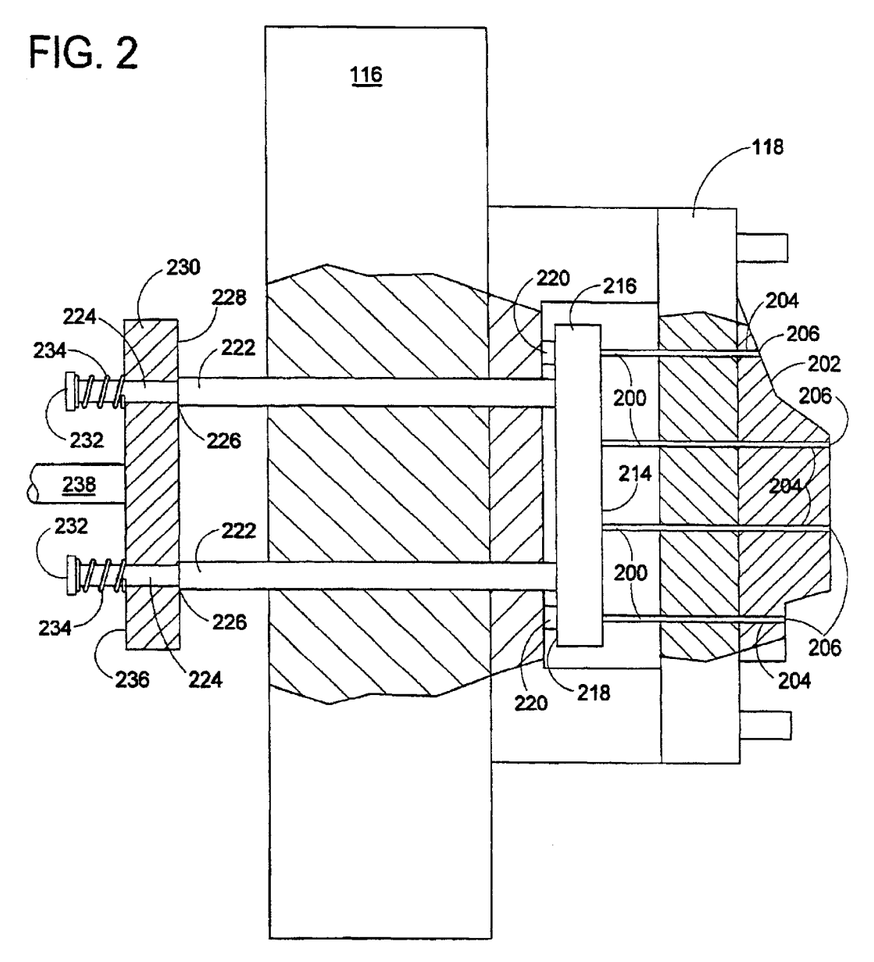
FIG. 2 is an enlarged, fragmentary view, partially in section, showing a portion of the part ejection system of the injection molding machine shown in FIG. 1, at a time before the ejector pins are extended beyond the molding surface.
Figure 3:
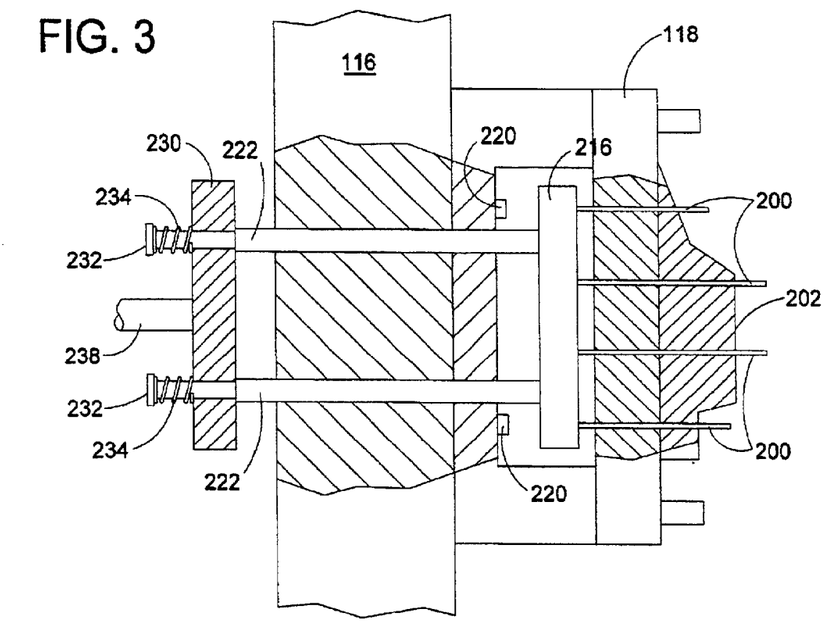
FIG. 3 is an enlarged fragmentary view similar to that of FIG. 2, wherein the ejector pins are in their extended position and extend beyond the molding surface, with the ejector plate in its forwardmost position relative to the molding surface.

Referring now to FIG. 2, there is shown a portion of part ejection unit 103 and mold half 118. A plurality of ejector pins 200 are disposed in spaced relationship relative to a molding surface 202 defined by mold half 118. Each of ejector pins 200 is slidably carried in a bore 204 that is provided in mold half 118 to enable the respective ejector pins to be slidably moved. Movement of ejector pins 200 occurs during the molding cycle from a retracted position, as shown in FIG. 2, in which the forward end 206 of each of the ejector pins is substantially coincident with molding surface 202, to an extended position, as shown in FIG. 3, in which each of the ejector pins extends into the volume of the mold cavity 122 that is partially defined by molding surface 202. Ejector pins 200 extend perpendicularly from a forward surface 214 of an ejector pin carrier, such as an ejector plate 216, to which they fixedly attached.

Ejector plate 216 has a rear surface 218 that engages ejector plate rear stops 220 when the ejector plate is in its rearwardmost position as shown in FIG. 2. Extending rearwardly from rear surface 218 of ejector plate 216 are a plurality of ejector rods 222 that are slidably carried by movable platen 116 and are securely connected with ejector plate 216 so that ejector rods 222 and ejector plate 216 move together relative to movable platen 116 and also relative to molding surface 202. Ejector rods 222 extend completely through movable platen 116 and have a reduced diameter outer end 224 that extends from a shoulder 226 that defines a stop surface against which the forwardmost surface 228 of a knock-out bar 230 abuts, so that when knock-out bar 230 is moved from the position shown in FIG. 2 in a direction toward mold half 118, front surface 228 of knock-out bar 230 contacts shoulders 226 of the respective ejector rods 222 to cause movement of ejector plate 216 and of ejector pins 200. The outer ends of ejector rods 222 include stop members 232 that serve as stop surfaces for respective compression springs 234 that bear against stop member 232 and against rear surface 236 of knock-out bar 230. An ejector drive rod 238 extends rearwardly from knock-out bar 230 to transfer the motive force from a source of linear thrust to initiate axial movement of ejector pins 200.

Movement of ejector drive rod 238 toward mold half 118 causes the respective parts of the ejection system to shift from their positions shown in FIG. 2 to their positions as shown in FIG. 3. In the FIG. 3 position, ejector plate 216 is at its forwardmost position, and ejector pins 200 have been moved to extend beyond molding surface 202 to contact a molded part (not shown) and thereby separate the part from molding surface 202 and eject the part from the mold. When in the position shown in FIG. 3, ejector plate 216 has moved away from ejector plate rear stop 220, thereby moving the head 206 of ejector pins 200 beyond molding surface 202, ejecting the molded part.

Figure 4:
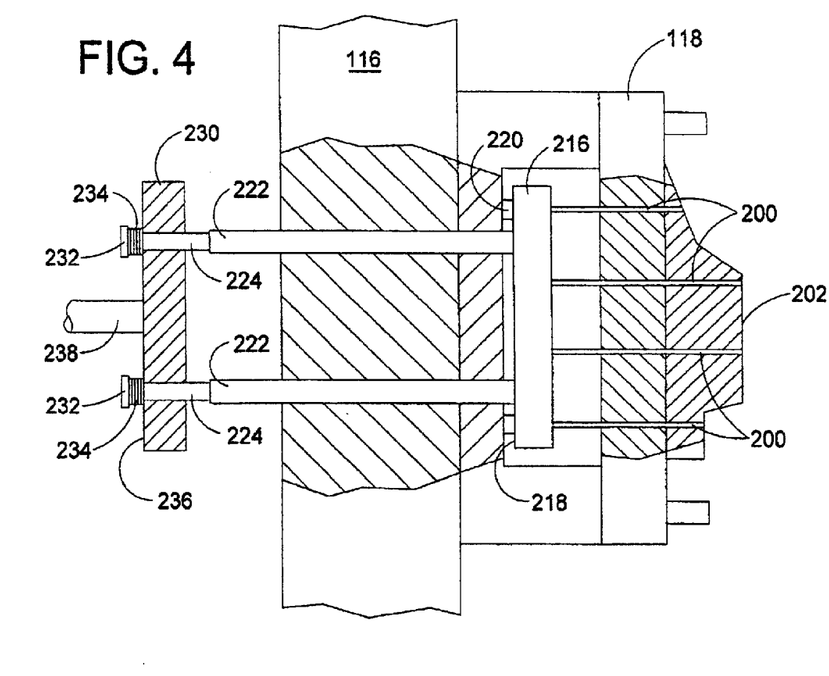
FIG. 4 is an enlarged fragmentary view similar to that of FIGS. 2 and 3, showing the ejector pins in their fully retracted position and the ejector plate and associated knock-out bar in their rearmost position relative to the molding surface.

Movement of drive rod 238 in a direction away from mold half 118 causes the several parts of the ejection system to move until they assume the positions shown in FIG. 4. The drive rod 238 pulls on knock-out bar 230, so that rear surface 236 applies force to the springs 234, which are contained by stop members 232. However, the springs 234 are not compressed on the initial rearward movement of the knock-out bar 230, since the force required to move the ejector rods 222 and draw ejector plate 216 away from mold half 118 is less than the force required to compress the springs 234. Rear surface 218 of ejector plate 216 contacts stop members 220 after the ejector pins 200 are drawn into mold half 118 to their respective retracted positions so that the ends 206 are flush with the molding surface 202. At this point, any additional rearward movement of knock-out bar 230 causes compression of springs 234 to provide a cushioning effect.

After removal of the molded part, a new molding cycle begins, whereupon the mold halves are again brought together to define the mold cavity and to allow molding material to be injected into the mold cavity. When the injected material has cooled sufficiently, the ejection system is again actuated to cause ejection of the molded part as the mold halves are separated from each other to expose the molded part to repeat the cycle.

Figure 5:
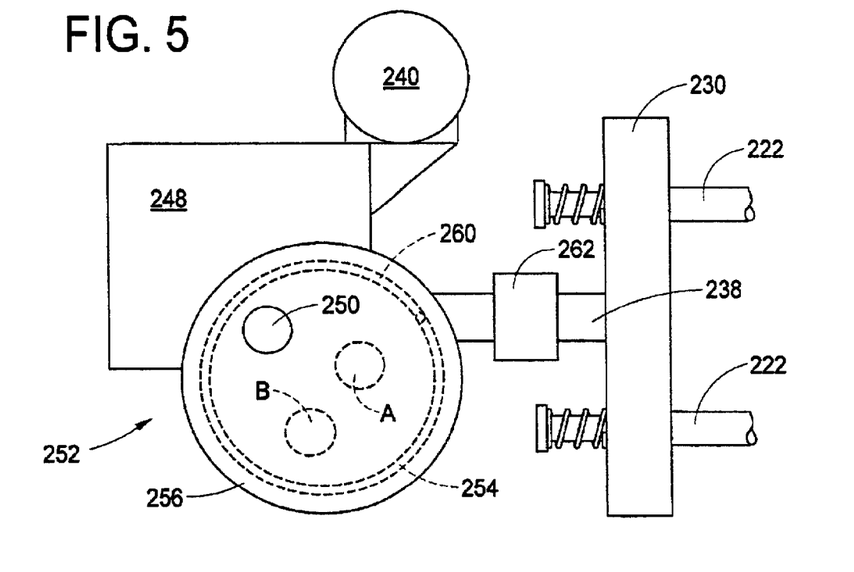
FIG. 5 is a fragmentary side elevational view of a drive mechanism of an ejection system in accordance with the present invention for shifting the knock-out bar and ejector pins toward and away from the mold cavity.
Figure 6:
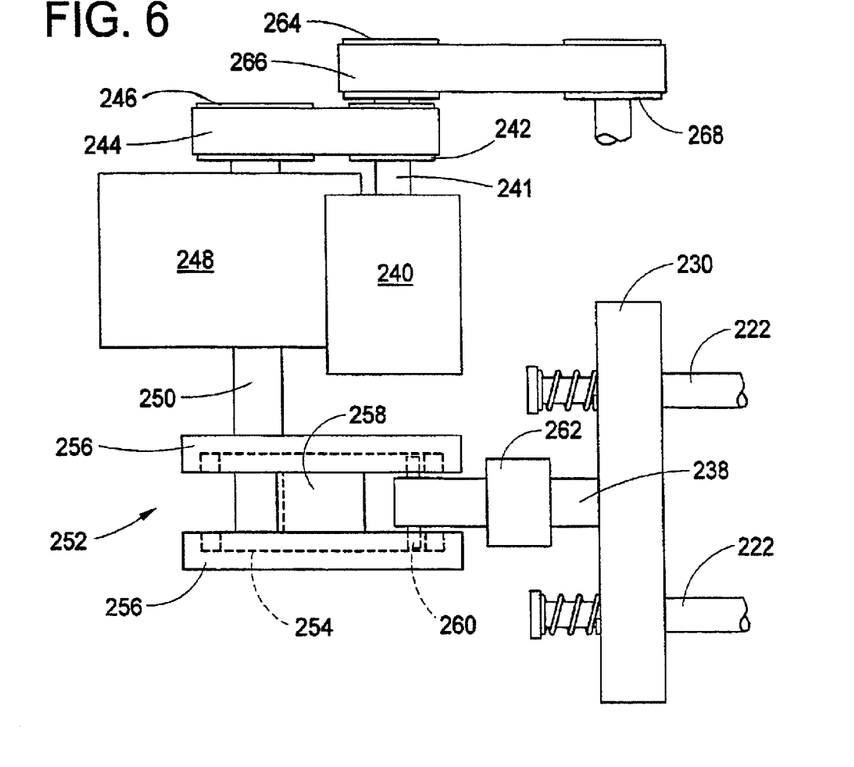
FIG. 6 is a fragmentary top plan view of the drive mechanism shown in FIG. 5, and also showing the ejection system electric drive motor and associated power transmission mechanisms.

Ejector drive rod 238 can be moved axially toward and away from mold half 118 by a drive mechanism of the type illustrated in FIGS. 5 and 6. A servomotor 240 has a shaft 241 that carries a first drive pulley 242 to drive a first drive belt 244 that passes around a first driven pulley 246, which can be connected with a suitable power transmission or "gearbox" 248. The gearbox 248 is provided to step down the rotational speed of the motor 240 and to amplify the servomotor output torque to desired levels to drive an output drive shaft 250. It should be noted that some applications of the part ejection unit 103 may not be require the gearbox 248. Depending on such factors as (a) the ejection force required, (b) the RPM and torque of the motor 240, and (c) the space available for drive pulleys, it may be desirable to provide a direct coupling between the motor shaft 241 and output drive shaft 250. This can be accomplished by several known methods, such as appropriately sized pulleys and belts.

A cam member 252 is carried on output drive shaft 250 and includes a cam groove that defines a generally circular cam track 254. As shown in FIG. 6, cam track 254 is defined by grooves formed in each of a pair of spaced, opposed parallel cam plates 256 that are interconnected by a hub 258 for joint rotation. A cam follower 260 is carried in cam track 254 and is secured to the rearmost end of ejector drive rod 238, which is slidably supported in a guide sleeve 262.

As shown in FIG. 6, output drive shaft 250 is offset from the center of cam member 252 and from the center of circular cam track 254. Consequently, rotation of output drive shaft 250 causes cam track 254 to describe a non-circular path, causing cam follower 260 to move linearly toward and away from the axis of output drive shaft 250. Accordingly, ejector drive rod 238 is moved axially, toward and away from the movable platen 116 and mold half 118. One rotation of cam member 252 about the axis of drive shaft 250 provides one operating cycle for ejector drive rod 238, and consequently also for ejector pins 200, to which drive rod 238 is operatively connected by means of the ejector drive system components described previously.

As will be apparent, the length of the stroke of ejector drive rod 238 is a function of the offset spacing of the cam track axis relative to the axis of output drive shaft 250. Thus, the greater the offset spacing, the longer the length of stroke of ejector drive rod 238. Different eject strokes can be accommodated by the relative start/stop position of the cam member 252 and drive rod 238 for each cycle, in combination with some amount of compression of the springs 234 to absorb rearward over-travel of the knock-out bar 230. Alternate locations for the axis of the output drive shaft 250 to modify the overall length of stroke are shown at "A" and "B" in FIG. 5.

In accordance with the present invention, first drive pulley 242 carried by servomotor output shaft 241 includes a first one-way mechanical clutch (not shown) so that operation of the ejection mechanism occurs only during one direction of rotation of servomotor 240. As was noted earlier, servomotor 240 is operated only during a very short time period during a complete molding cycle to operate the molded part ejection system. Consequently, during the remainder of a molding cycle, servomotor 240 would be idle and the power available therefrom would be unused. Accordingly, to make fuller use of servomotor 240, servomotor output drive shaft 241 also carries a second drive pulley 264 that includes a second one-way mechanical clutch (not shown) that is operable when servomotor 240 is operated in the reverse direction from that in which it is operated to actuate the part ejection mechanism. Second drive pulley 264 drives a second drive belt 266 that passes around a second driven pulley 268 to provide rotary power during that portion of the molding machine operating cycle in which the ejection mechanism is not in operation.

For example, output from second drive pulley 268 can be utilized to drive a linear actuator (not shown), such as a screw mechanism. Alternatively, the output can be used to drive a pump (not shown) to recharge an accumulator, for example, for performing additional molding machine functions that can utilize compressed air or a non-petroleum-based fluid for operating other devices, such as a core-pull arrangement for withdrawing cores from molds that include such elements. Thus, the available power from servomotor 240 can be utilized to perform several functions during a machine operating cycle: (i) during the part ejection portion of the cycle, it can cause the ejection of molded parts while servomotor 240 is operated in one direction of rotation; and (ii) after the ejection system operation has been completed, the servomotor can be operated in the reverse direction of rotation to provide power for other functions that the molding machine must perform during a machine operating cycle. Thus, the part ejection system servomotor is more effectively utilized, for a greater period of time and to perform several functions during a molding machine operating cycle.

Figure 7:
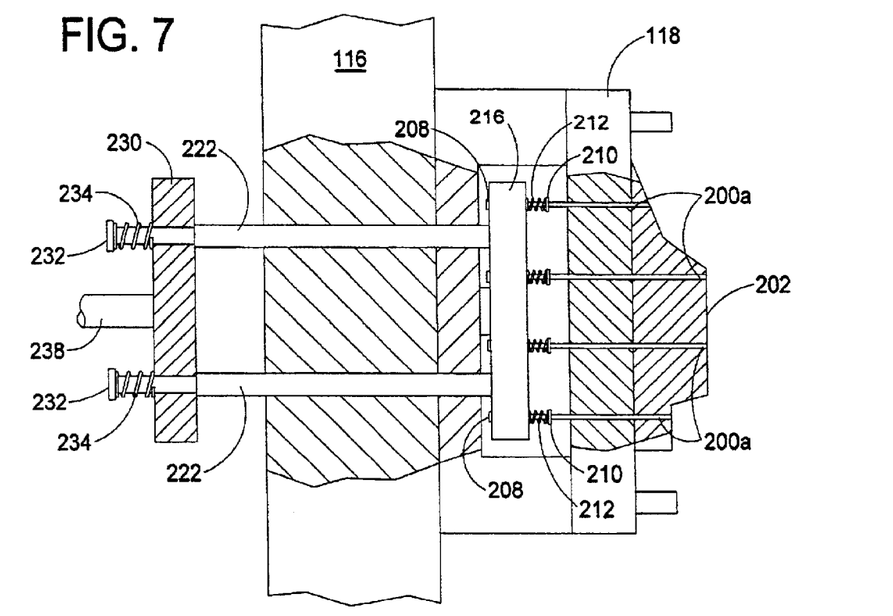
FIG. 7 is an enlarged fragmentary view similar to FIG. 2, showing an alternate embodiment for the part ejection system of the injection molding machine shown in FIG. 1, at a time before the ejector pins are extended beyond the molding surface.
Figure 8:
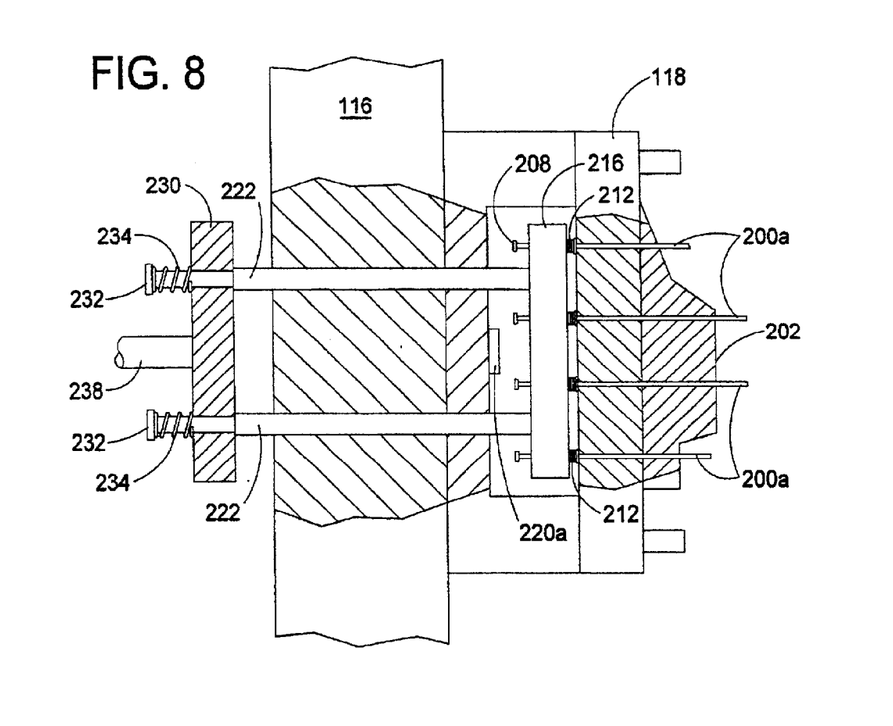
FIG. 8 is an enlarged fragmentary view similar to that of FIG. 7, wherein the ejector pins are in their extended position and extend beyond the molding surface, with the ejector plate in its forwardmost position relative to the molding surface.

Referring now to FIG. 7, there is shown an alternate embodiment of the part ejection unit 103. Common reference numbers are used to identify parts that are common between the two embodiments described. As before, plurality of ejector pins 200a are disposed in spaced relationship relative to the molding surface 202 defined by mold half 118. Each of the ejector pins 200a is slidably carried in a bore 204 that is provided in mold half 118 to enable the respective ejector pins to be slidably moved. Movement of ejector pins 200a occurs during the molding cycle from a retracted position, as shown in FIG. 7, in which the forward end 206 of each of the ejector pins is substantially coincident with molding surface 202, to an extended position, as shown in FIG. 8, in which each of the ejector pins extends into the volume of the mold cavity that is partially defined by molding surface 202. Ejector pins 200a include an enlarged end stop member 208 that is disposed at the opposite ends of pins 200 from the forward end 206. Additionally, each of ejector pins 200a includes an intermediate, outwardly-extending flange 210 positioned between the ends of the pins, that serves as a spring stop for a compression spring 212 that is carried between flange 210 and the forward surface 214 of the ejector plate 216 within which ejector pins 200a are slidably carried.

The rear surface 218 of the ejector plate 216 engages an ejector plate rear stop member 220a when the ejector plate is in its rearwardmost position as shown in FIG. 7. As in the previous embodiment, a plurality of ejector rods 222 extend rearwardly from the ejector plate 216 and are slidably carried by movable platen 116.

Movement of ejector drive rod 238 toward mold half 118 causes the respective parts of the ejection system to shift from their positions shown in FIG. 7 to their positions as shown in FIG. 8. In the FIG. 8 position, ejector plate 216 is at As forwardmost position, and ejector pins 200a have been moved to extend beyond molding surface 202 to contact a molded part (not shown) and thereby separate the part from molding surface 202 and eject the part from the mold. When in the position shown in FIG. 8, ejector plate 216 has moved away from ejector plate rear stop 220a, and respective compression springs 212 surrounding ejector pins 200 have been compressed to bear against intermediate flanges 210 and thereby urge ejector pins 200 toward the molded part. The distance that the ejector pins 200a extend beyond the molding surface 202 is equal to the length of travel of the ejector plate 216 minus the amount of compression of springs 212. Use of the springs 212 on the ejector pins 200a eliminates the need to decelerate eject forward before the part knockout reaches end of travel, effectively protecting the ejector system from overload, somewhat like the cushioning effect in a conventional hydraulic eject system.

Movement of the drive rod 238 in a direction away from mold half 118 causes the several parts of the ejection system to move back to the positions shown in FIG. 7. The drive rod 238 pulls on knock-out bar 230 to move the ejector rods 222 rearwardly and draw ejector plate 216 away from maid half. This movement of the ejector plate 216 releases compression of the springs 212 until the rear surface 218 of ejector plate 216 contacts end stop members 208 of respective ejector pins 200a, drawing the pins 200a into mold half 118 and away from the mold cavity to their respective retracted positions. Over-travel of knockout bar 230 can be accommodated by springs 234 on ejector rods 222, as described for the previous embodiment.

Figure 9:
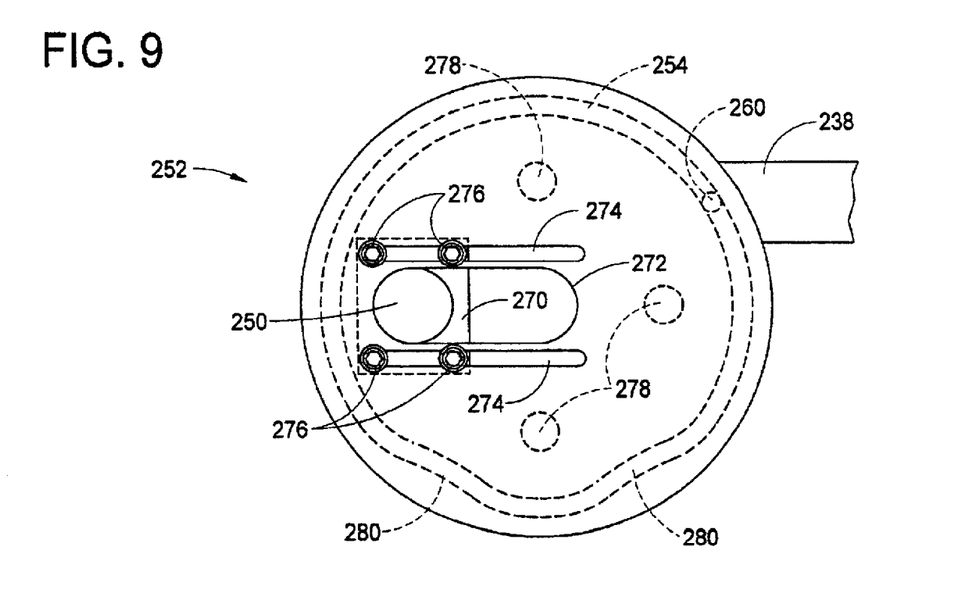
FIG. 9 is a fragmentary side elevational view of an alternate embodiment for the cam member in the drive mechanism of an ejection system in accordance with the present invention.
Figure 10:
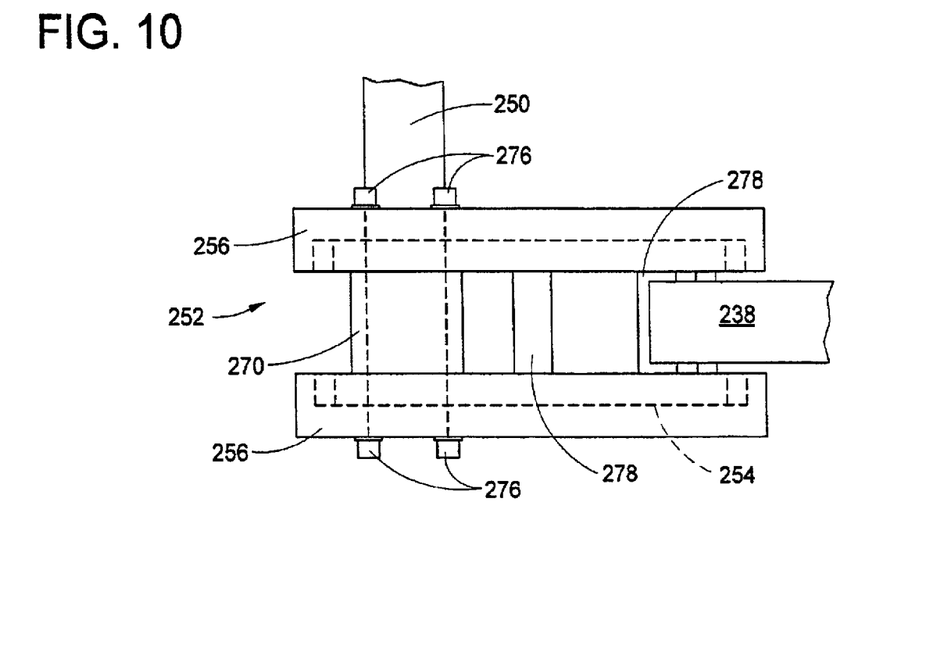
FIG. 10 is a fragmentary top plan view of the alternate embodiment for the cam member of the drive mechanism shown in FIG. 9.

An alternate embodiment for the cam member 252 is shown in FIGS. 9 and 10. As described previously, output drive shaft 250 is offset from the center of cam member 252 and from the center of circular cam track 254, so that the length of the stroke of ejector drive rod 238 is a function of the offset spacing of the cam track axis relative to the axis of output drive shaft 250. To provide more accurate adjustment of the length of stroke of ejector drive rod 238, the output drive shaft 250 is mounted in a bearing block 270 that is received between the cam plates 256 and can be variably positioned relative to the center of cam member 252. An elongated shaft opening 272 is provided in the cam plates 256 to accommodate the output shaft 250. Parallel mounting slots 274 are provided outside the shaft opening 272, to receive mounting bolts 276.The bolts 276 pass through the respective cam plates 256 and engage the block 270. To maintain alignment of the cam plates 256 and provide stability during adjustment of the bearing block 270, spacers 278 are used to interconnect the cam plates 256.

This mounting arrangement allows location of the drive shaft 250 at any radial position along the opening 272, providing a means of accurately setting the desired eject stroke length. With the stroke length being precisely controlled, the start point of the ejection stroke will be at the same point for each rotation the cam member 252, which means that maximum force will be applied at the beginning of the stroke regardless of the length of the stroke.

It is often desirable for the ejector pins to pulsate, i.e., stroke more than once, to effectively eject the part from the mold cavity. Although this can be accomplished by multiple revolutions of the cam member 252 with the generally circular cam track 254, as shown in FIGS. 5 and 6, the embodiment of the cam member 252 shown in FIG. 9 will pulsate the ejector pins in a single revolution. The pulsations are achieved by modifying the configuration of the cam track 254 so that it is not uniformly circular, as described previously. In particular, the track 254 is provided with one or more indents 280 that deviate from a generally circular path. With this configuration, as the cam member 252 rotates and the cam follower 260 encounters the indents 280 in the cam track 254, the ejector drive rod 238 will retract slightly (or otherwise deviate from a uniform forward motion, depending on the contour of the offset 280) then resume the normal ejector stroke.

For the embodiment shown in FIG. 9, the cam track 254 will generate two pulsations during the course of the stroke of the ejector drive rod 238 that is produced by one rotation of the cam member 252. The number, location and configuration of the indents 280 in the track 254 can be varied to generate the pulsations or oscillations that best suit a particular molding application.

INDUSTRIAL APPLICABILITY

As described above, the present invention is directed to a part ejection apparatus for separating a molded part from a molding surface and for ejecting the molded part from a mold cavity defined by a pair of mold members. In particular, the apparatus includes an electrically-powered ejector pin drive system that uses an eccentric cam-and-follower mechanism to convert the rotary input of an electric motor to linear movement for moving the ejector pin actuator. The cam arrangement is adjustable to enable the length of the ejector stroke to be optimized for the application. In addition, the motion imparted to the follower by the cam member can be customized to pulsate the ejector pins during a single revolution of the cam member.

Although particular embodiments of the present invention have been illustrated and described it will be apparent to those skilled in the art that various changes and modifications can be made without departing from the scope of the present invention. For example, rather than using mounting slots 274 and bolts 276 to position the bearing block 270, other adjustment means, such as a jack screw can be used to locate the block 270 and thereby adjust the length of the ejector stroke. Accordingly, it is intended to encompass within the appended claims all such changes and modification that fall within the scope of present invention.

What is claimed is:

1. Ejection apparatus for separating a molded part from a molding surface of a mold cavity defined by a pair of cooperating mold members in a mold assembly of an injection molding machine, the mold assembly including at least one ejector pin mounted in an ejector plate for movement relative to the molding surface, the ejection apparatus comprising an electrically-powered ejector drive system for moving the ejector plate relative to the molding surface with an electric motor having a rotatable output shaft, at least one ejector rod extending from and connected with the ejector plate for movement therewith and slidably supported in a movable platen that carries one of the mold members, a knock-out bar for moving the ejector rods wherein the ejector rods are slidably carried by the knock-out bar for limited movement relative thereto, a spring positioned between an end of each ejector rod and the knock-out bar, the spring being compressed by over-travel of the knock-out bar in a direction away from the mold member, a cam member connected with the motor output shaft, and a cam follower operatively coupled with the knock-out bar, such that the cam follower interacts with the cam member to convert rotation of motor drive shaft to linear movement of the ejector plate toward and away from the molding surface when the motor is rotated in only one direction of rotation.

2. Ejection apparatus in accordance with claim 1, wherein the ejector pin is slidably carried by the ejector plate.

3. Ejection apparatus in accordance with claim 2, wherein the ejector pin includes an enlarged end stop member at its inner end to limit outward travel of the ejector pin relative to the ejector plate.

4. Ejection apparatus in accordance with claim 3, wherein the ejector pin includes an intermediate, outwardly-extending flange, and a compression spring positioned between the flange and the ejector plate for biasing the ejector pin into an extended position relative to the ejector plate.

5. Ejection apparatus in accordance with claim 1, wherein the cam member includes a substantially circular cam track and the cam track axis is offset from an axis of the drive shaft that rotates the cam member so (hat the cam follower moves linearly.

6. Ejection apparatus in accordance with claim 5, wherein the cam member includes means for adjusting the relative offset of the cam track axis to the axis of the drive shaft.

7. Ejection apparatus in accordance with claim 6, wherein the means for adjusting the relative offset of the cam track axis comprises discrete alternate mounting locations for the drive shaft in the cam member.

8. Ejection apparatus in accordance with claim 6, wherein the means for adjusting the relative offset of the cam track axis comprises means for variably displacing the location of the drive shaft relative to a central axis of the cam member.

9. Ejection apparatus in accordance with claim 8, wherein the means for variably displacing the location of the drive shaft relative to a central axis of the cam member comprises a bearing block to receive the drive shaft and means for adjusting the mounting position of the bearing block in the cam member.

10. Ejection apparatus in accordance with claim 5, wherein the cam track of the cam member includes at least one portion that varies from the substantially circular path of the cam track to generate a pulsation in the linear movement of the ejector plate when the cam member is rotated.

11. Ejection apparatus in accordance with claim 1, wherein the motor drives a first drive pulley that includes a first one-way clutch operatively coupled with the ejector drive system for moving the ejector pins toward and away from the molding surface while the motor rotates in only one direction of rotation, the motor also driving a second drive pulley that includes a second one-way clutch operatively coupled with a second drive system of the injection molding machine, such that the second drive system operates only when the motor rotates in a direction opposite from that for operating the ejector drive system.

* * * * *